(12) United States Patent
Botsolas et al.

(10) Patent No.: US 6,283,158 B1
(45) Date of Patent: Sep. 4, 2001

(54) INSULATION COVERAGE SYSTEM AND METHOD FOR INHIBITING BIOLOGICAL CONTAMINATION

(75) Inventors: Christos J. Botsolas, Clearwater, FL (US); Jeff Rebholz, Indianapolis, IN (US)

(73) Assignee: Proto Corp., Clearwater, FL (US)

( * ) Notice: Subject to any disclaimer, the term of this patent is extended or adjusted under 35 U.S.C. 154(b) by 0 days.

(21) Appl. No.: 09/605,519

(22) Filed: Jun. 28, 2000

(51) Int. Cl.⁷ .................................................. F16L 11/12
(52) U.S. Cl. ........................ 138/110; 138/149; 138/157; 138/107; 285/58
(58) Field of Search .................................. 138/110, 157, 138/156, 106, 107, 103, 149; 248/58

(56) References Cited

U.S. PATENT DOCUMENTS

| | | | |
|---|---|---|---|
| 1,771,007 | 7/1930 | Weaver | 4/418 |
| 3,289,702 * | 12/1966 | Sherburne | 138/162 X |
| 3,495,629 * | 2/1970 | Botsolas et al. | 138/149 |
| 3,653,618 * | 4/1972 | Kindorf et al. | 248/58 |
| 3,732,894 | 5/1973 | Botsolas | 138/178 |
| 3,965,938 * | 6/1976 | Bauerle et al. | 138/107 |
| 4,093,683 | 6/1978 | Harley | 138/156 X |
| 4,553,308 | 11/1985 | Botoslas | 13/178 X |
| 4,669,509 | 6/1987 | Botoslas | 138/178 |
| 4,728,540 | 3/1988 | Gasman | 427/385.5 |
| 4,807,669 * | 2/1989 | Prestidge, Sr. | 138/178 |
| 4,830,060 | 5/1989 | Botsolas | 138/149 |
| 4,862,528 | 9/1989 | Clarke et al. | 138/103 X |
| 5,024,249 | 6/1991 | Botsolas | 138/110 |
| 5,054,513 | 10/1991 | Trueb et al. | 138/155 X |
| 5,055,334 | 10/1991 | Lechuga | 138/149 X |
| 5,192,039 * | 3/1993 | Williams | 138/107 X |
| 5,341,830 | 8/1994 | Helmsderfer et al. | 138/157 X |
| 5,381,833 * | 1/1995 | Cummings et al. | 138/107 |
| 5,547,228 * | 8/1996 | Abbema et al. | 285/22 |
| 5,566,984 * | 10/1996 | Abbema et al. | 285/22 |
| 5,575,402 * | 11/1996 | Botsolas | 220/565 |
| 5,984,370 * | 11/1999 | Lewis | 285/22 |

* cited by examiner

Primary Examiner—Patrick Brinson
(74) Attorney, Agent, or Firm—Hedman & Costigan, P.C.

(57) ABSTRACT

A thermoformed PVC, modified PVC, CPVC, metal or coated metal cover, covering system and method is provided for covering assemblies of pipe and pipe insulation, hangers, support rods and mechanical assemblies wherein the assembly is biocide treated, covered by and completely enclosed by the cover, the cover is sealed in order to prevent bacteria growth within the cover while allowing a smooth outside surface for biocide application. The cover can be modified to facilitate the application of biocide after the assembly is covered by providing resealable openings in said cover.

12 Claims, 8 Drawing Sheets

FIG. 11

# INSULATION COVERAGE SYSTEM AND METHOD FOR INHIBITING BIOLOGICAL CONTAMINATION

BACKGROUND OF THE INVENTION

1. Field of the Invention

The present invention relates to the field of pipe insulation. More particularly, the present invention relates to the field of pipe insulation for industrial food processing installations and the prevention and inhibition of biological contamination of foodstuffs during processing.

2. Background of the Related Art

Food contamination by bacteria such as salmonella, listeria monocytogenes, campylobacter jejuni, *E. coli*, yersenia enterocolitica and possibly others have been the cause of the loss of millions of dollars and pounds of food products being recalled from the market place and disposed of, particularly during recent years. The present invention presents a novel solution to this contamination problem thereby addressing a serious public health problem and eliminating large scale waste of food.

Currently, treatment of foods by irradiation appears to be the most efficient means for preventing bacterial contamination of foods. However, the irradiation process tends to affect certain foods, such as changing the color of red meat to an unappetizing brown. In addition, many persons and organizations are concerned about the levels of irradiation being used to ensure uncontaminated food. Therefore, processing the foods under very clean conditions and reducing the amount of irradiation to an acceptable level to ameliorate public concern and minimize aesthetic drawbacks such as color change is a better approach. Unfortunately, maintaining a very strict sanitary environment requires changing piping, hangers, pumps, equipment and all parts of the food processing system. Although generally the present existing systems that are in direct contact with food are designed for easy removal and flushing out with scalding water or steam, other mechanical piping in the area of the system, exterior of process water, including electrical conduit piping, etc. needs to be addressed. Therefore a system of covering over all piping and equipment with thermoformed PVC, higher temperature modified PVC/acrylic, chlorinated vinyl resin (CPVC), metal or coated metal in areas of scalding wash downs or steam cleaning to reduce to an absolute minimum any area where bacteria growth is possible is very important. The system of covering surfaces with PVC is fairly common in food plants, both on bare piping and on insulated piping etc. The use of PVC or CPVC with its high chlorine content deters bacteria growth, and is an ideal primary material for this use. Another advantage is that PVC covers these areas with a minimum disturbance of painted and insulated surfaces on existing systems. However, conventional PVC coverings alone can not guarantee a contaminant-free environment because conventional PVC coverings do not completely encase the assemblies. Therefore, a need exists for PVC or modified PVC pipe coverings that completely encase the mechanical assemblies present in food processing plants. Furthermore, a need exists for pipe covering which can accommodate application of biocides. Finally, there exists a need for a system combining thermoformed PVC or modified PVC-type covering in a food processing plant with reduced irradiation of foods.

It is therefore an object of the present invention to provide a PVC or modified PVC cover which is sealed for covering assemblies of pipe and pipe insulation, hangers and support rods, wherein said cover completely encloses the entire assembly in order to prevent bacteria growth while allowing a smooth surface for easy biocide cleaning.

It is another object of the present invention to form the aforementioned cover of PVC, modified PVC/Acrylic, CPVC, metal or coated metal or any other suitable material that tends to discourage bacteria growth.

It is a further object of the present invention to provide a system wherein biocide can be brushed, wiped or sprayed over all the portions of the assembly to kill bacteria before installing the cover.

It is still a further object of the present invention to provide a space under the cover for a thin absorptive sponge type material to which a biocide can be applied periodically through one or more small resealable openings that can be formed in the cover, thereby renewing and refreshing the biocidal activity beneath the cover.

It is yet another object of the present invention to provide a cover comprising a split PVC tube that is pressed in place over a PVC coated support rod attached to the hanger of an assembly to be covered.

It is still yet another object of the present invention to provide shaped PVC, Acrylic modified PVC, CPVC (or other type) formed elbow, tees, valves, specialty fittings, bare conduit, piping, pumps and equipment that lends itself to being enclosed and/or being treated with biocide prior to being sealed in place.

It is still a further object of the present invention to provide a system of the aforementioned coverings for assemblies and fittings in a typical food processing facility to prevent biological contamination of foodstuffs.

It is still yet a further object of the present invention to provide a method for preventing biological contamination of foodstuffs in a food processing facility comprising the steps of providing the aforementioned system of coverings and irradiating food at the lowest possible level that will destroy bacteria.

SUMMARY OF THE INVENTION

The present invention provides a novel thermoformed PVC, modified PVC/acrylic, CPVC, metal or coated metal covering for mechanical assemblies in food plants, such as but not limited to piping, hangers and the like whether the assemblies are insulated, uninsulated, painted, bare or otherwise. The present invention provides a continuous barrier over mechanical assemblies in food plants wherein said assemblies are highly susceptible to bacterial contamination. In one embodiment, the invention is a pipe insulation saddle for covering a clevis-type hanger and a portion of pipe supported by the hanger. It can be seen that this type of mechanical assembly is a fertile ground for bacteria growth. In this embodiment the hanger and pipe cover encases the entire hanger and pipe assembly inside a formed PVC or modified PVC shape that is sealed into place with a suitable adhesive such as but not limited to PVC cement or the like. This allows sprayed or brushed-on biocide such as but not limited to Lysol or other FDA approved material, to be applied onto the assembly prior to the installation of the cover. A small sponge material or the like can be inserted under the cover, preferably saturated with biocide prior to sealing the cover in place. A small opening or openings can be provided in the cover above the sponge area and periodic applications of biocide can be directed onto the sponge area. The opening can be sealed with PVC cement, PVC tape, a PVC patch or any reasonably suitable substitute. This and other modifications of this embodiment results in an atmosphere under the cover that deters and minimizes bacteria growth.

The smooth, chemical resistant PVC or modified PVC cover lends itself to easy cleaning such as by wipe on method.

In another embodiment the invention comprises substantially a humped formed fitting cover that is made with a deliberate hump molded in to cover existing insulated fittings. This embodiment eliminates the need to shave or remove the fitting for reinsulation, preventing possible asbestos cement contamination in the area. This is a considerable improvement over the current available alternative which is to remove the asbestos under strict regulations at very high costs. In this embodiment the PVC or modified PVC cover can accommodate the application of a biocide between the insulated fitting and the PVC cover. The biocide may be applied to the exterior of the insulated fitting or to the interior of the cover. In another embodiment a material such as a sponge for carrying a biocide may be inserted between the fitting and the formed PVC covering. The cover may further include a resealable opening for applying additional biocide after the covering is installed over the fitting. The hump feature may be applied to fitting covers for 45 degree elbows, tees and all other fittings and assemblies.

Fitting covers of all shapes may be employed with the present invention. In addition, fitting covers without the hump feature may be employed in new installations over shaped type insulations.

The foregoing embodiments provide for a system wherein a thin sponge material such as but not limited to 1/8" thick soft polyurethane can be saturated with Food and Drug Administration approved biocide, inserted between a cover of the present invention and fitting or assembly to be covered and the cover sealed over, creating a biocide atmosphere to prevent bacteria growth under the cover. Small openings can be provided in the cover to allow a periodic application of biocide material to maintain an antibacterial atmosphere under the sealed PVC cover or jacket. The opening can be resealed with PVC cement or a round dot of PVC tape or a suitable substitute. On CPVC jacketing and covering the opening is preferably sealed with CPVC cement. In the present invention it is critical that all joints between PVC or modified PVC covers and jacketing be sealed tight with a suitable adhesive or the like.

In embodiments in which there is insufficient space for a sponge, the biocide material can be painted on or wiped on, before applying and sealing the cover or jacketing. This system may be employed on all unions, valve covers, Victaulic type covers, specialty fittings such as is disclosed in U.S. Pat. No. 5,335,697 to Botsolas, incorporated herein by reference, flanges and the like. The present invention also applies to all bare fittings and pipes.

DETAILED DESCRIPTION OF THE PREFERRED EMBODIMENT

Figure 1:
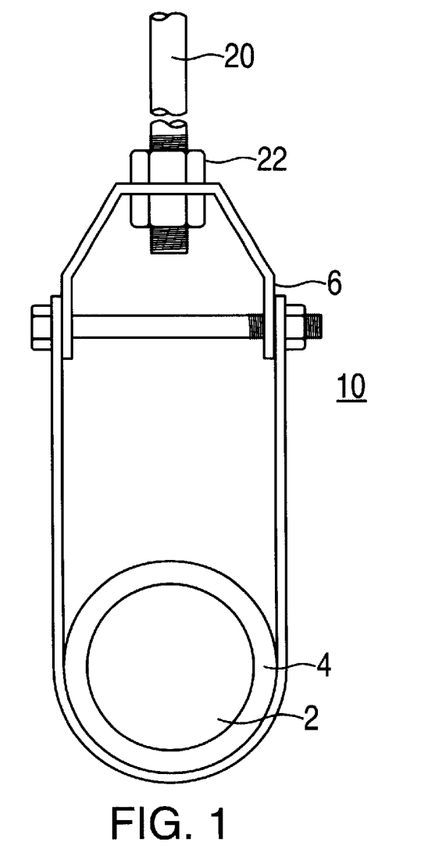
FIG. 1 is a front perspective view of an assembly to be covered by the present invention.
Figure 2:
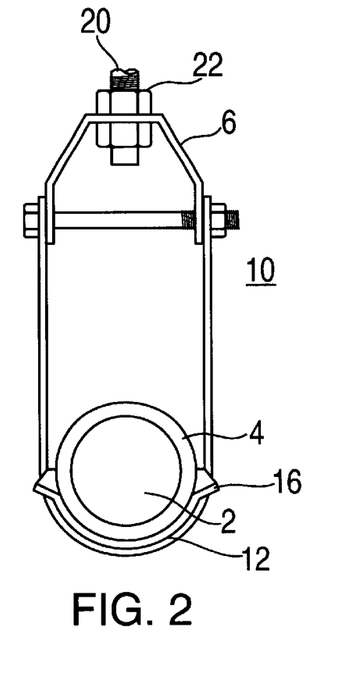
FIG. 2 is a front perspective view of a modified version of the assembly of FIG. 1.
Figure 3:
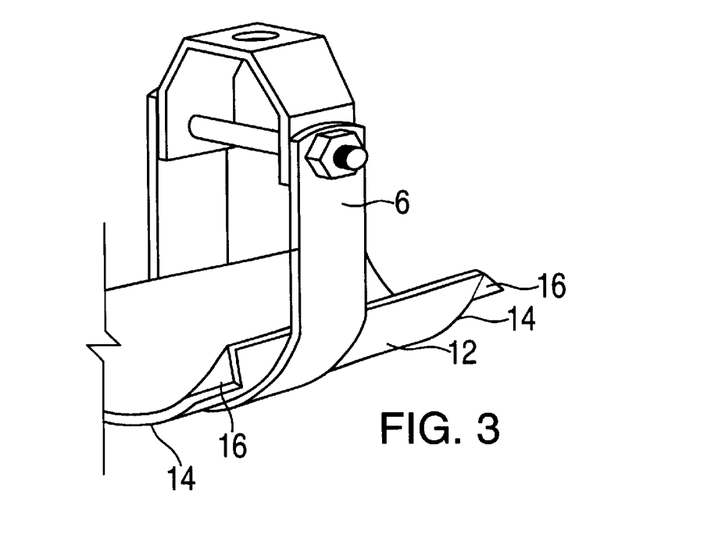
FIG. 3 is a perspective view of selected elements of the assembly of FIG. 2.
Figure 4:
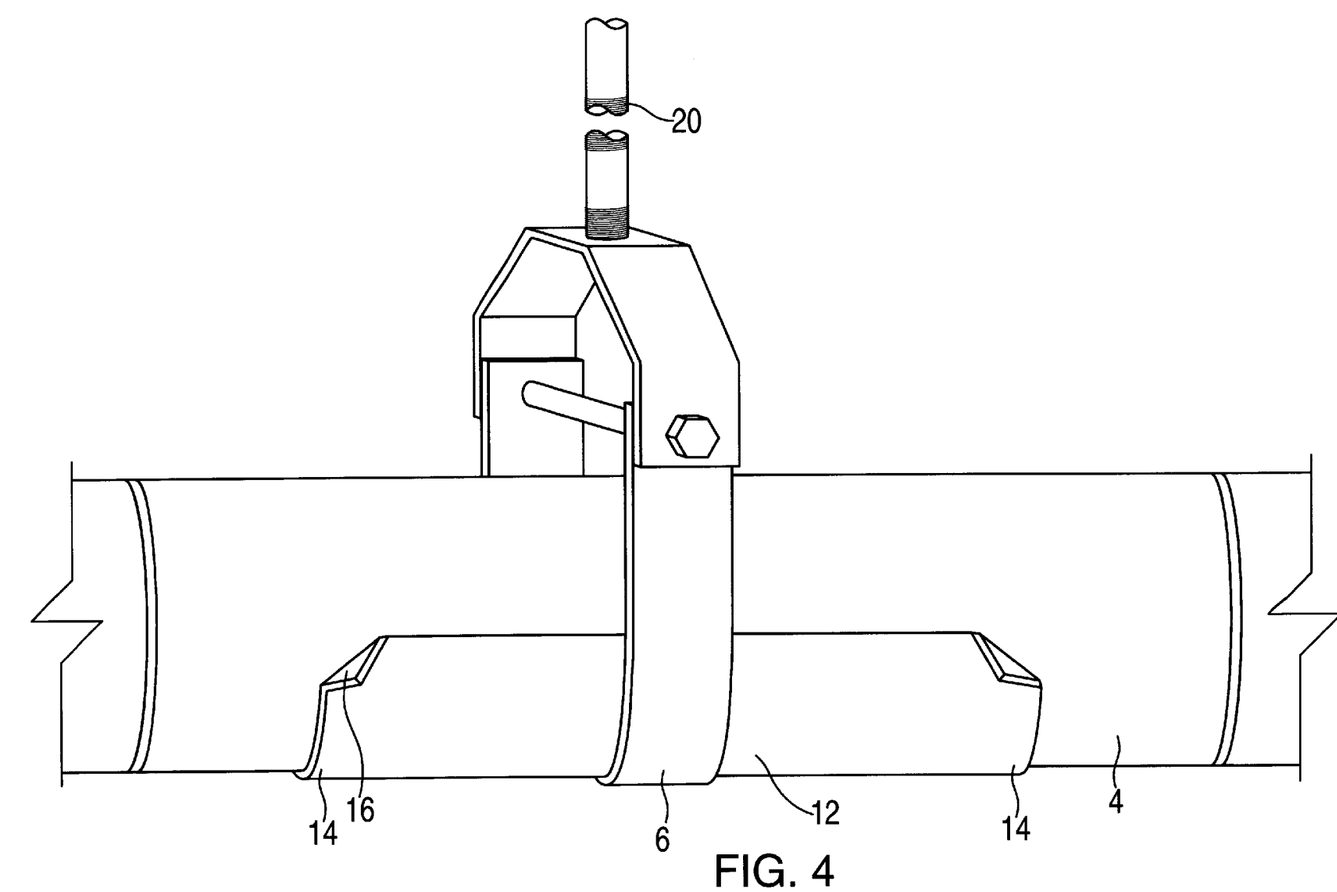
FIG. 4 is a side perspective view of the assembly of FIG. 2.

Now referring to FIG. 1, a typical assembly 10 to be covered by a preferred embodiment of the present invention comprises an insulated pipe 2 supported by a clevis type hanger 6, said hanger 6 connected to rod 20 by connecting means 22. Pipe 2 is typically contained in insulation jacketing 4. Now referring to FIGS. 2, 3 and 4, assembly 10 may further comprise pipe insulation saddle 12 with long ends 14 having approximate 1/8" radius bend corners 16 to prevent corners 16 of the saddle 12 from tearing the pipe insulation jacketing 4.

Figure 5:
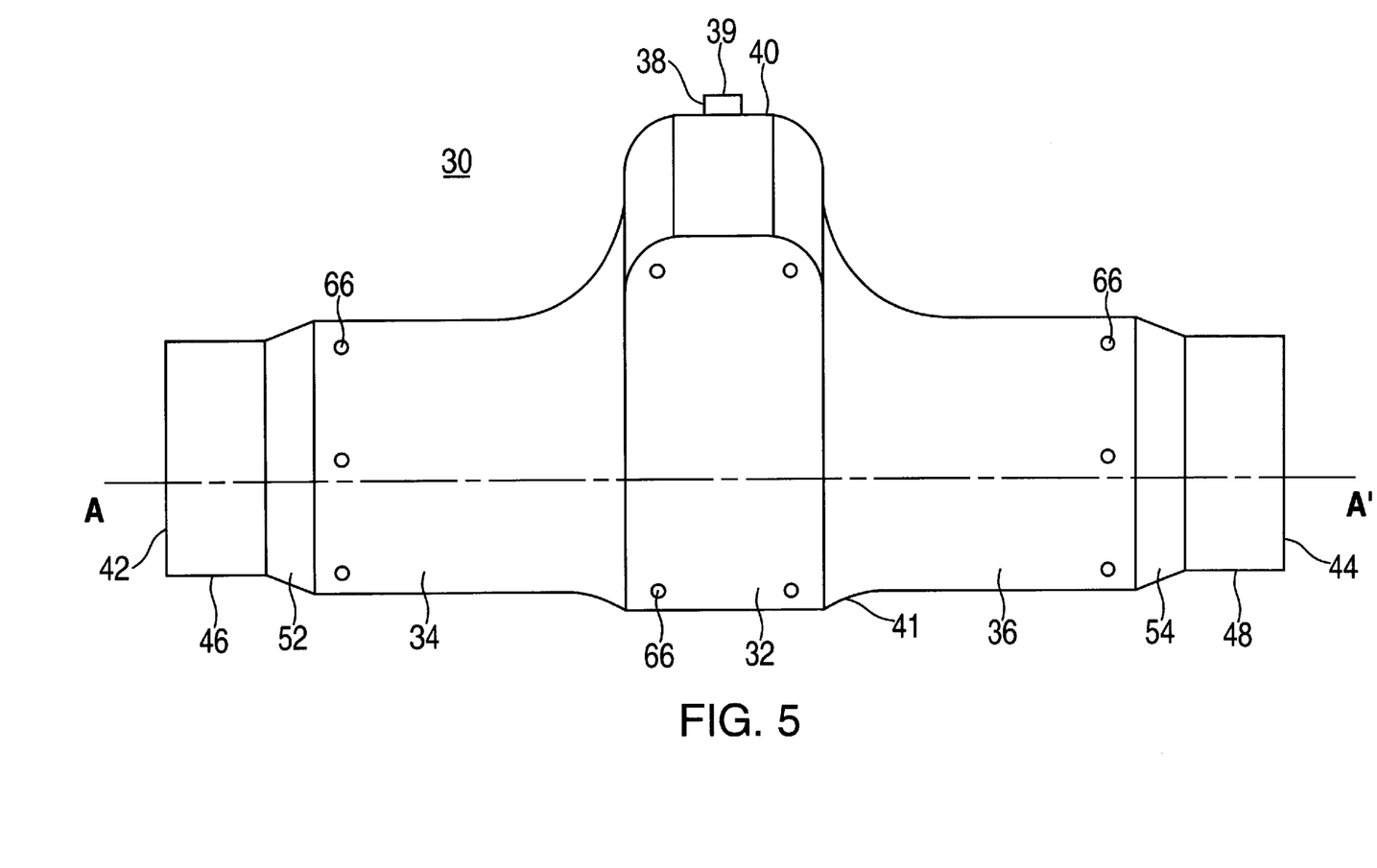
FIG. 5 is a front view of a preferred embodiment of the covering of the present invention.
Figure 6:
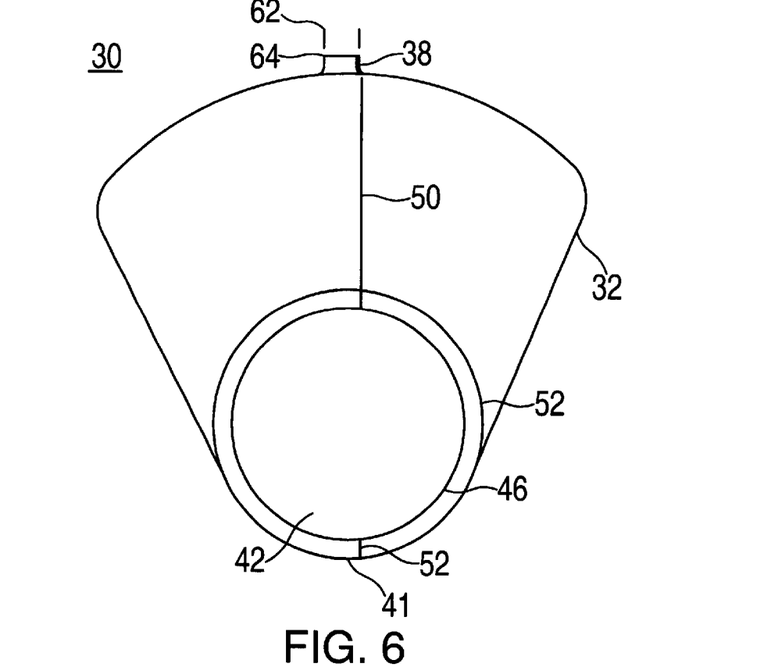
FIG. 6 is a side view of the covering FIG. 5 taken along the line A-A'.
Figure 7:
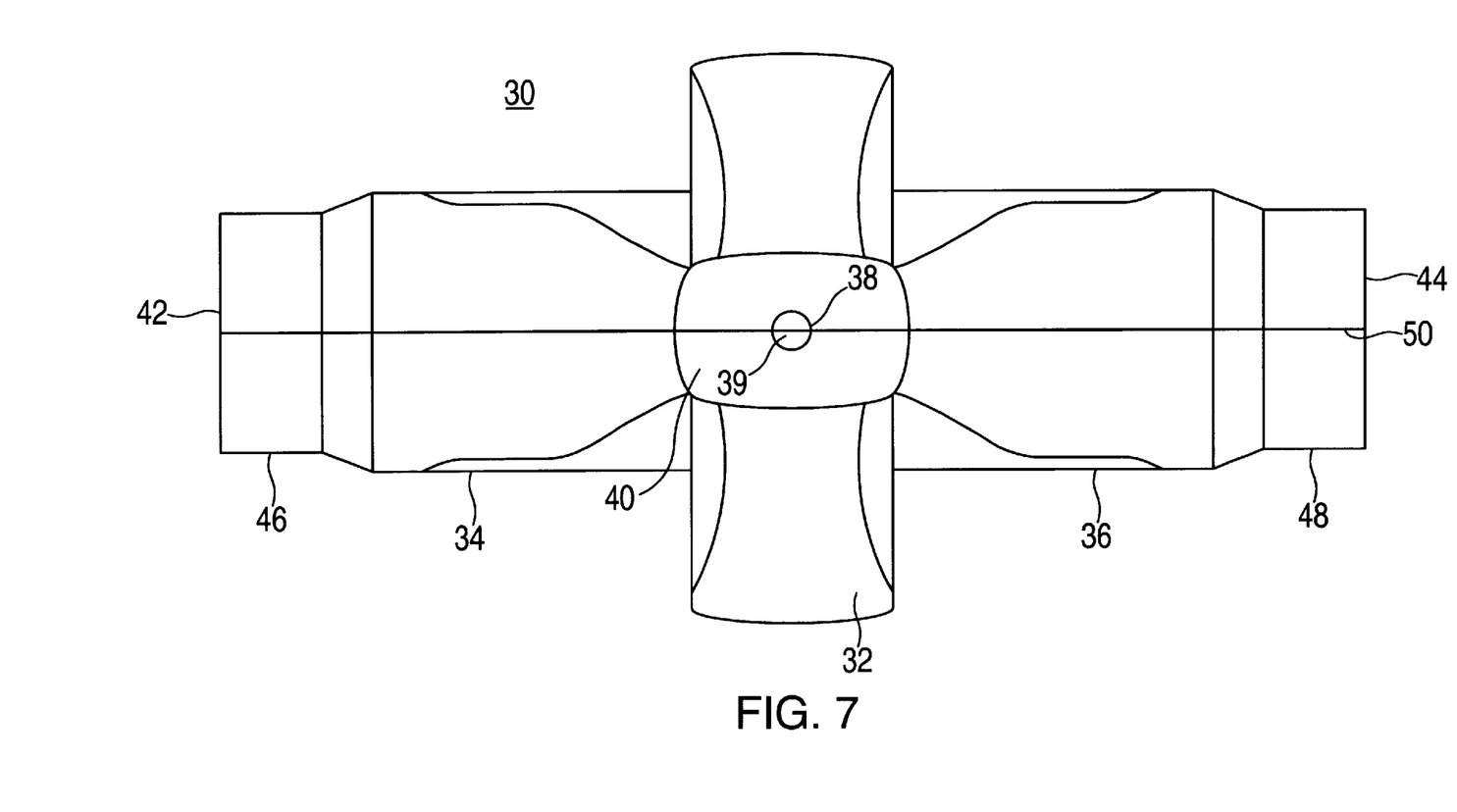
FIG. 7 is a top plan view of the embodiment of FIG. 5.

Now referring to FIGS. 5 and 6, the preferred embodiment of the invention is a novel thermoformed cover 30 formed of PVC, modified PVC/acrylic, CPVC, metal or coated metal covering for covering assemblies in food plants, such as but not limited to piping, hangers and the like such as clevis-type hanger and pipe assembly 10 shown in FIGS. 1–4. Cover 30 comprises a continuous barrier which encases the entire assembly 10 and is sealed into place with a suitable adhesive such as but not limited to PVC cement or the like. Now referring to FIG. 7, the cover 30 of the preferred embodiment is shown installed onto assembly 10 as shown in FIGS. 1–4. As best seen in FIGS. 5, 6 and 7, the cover 30 comprises central wedge-shaped section 32, elongated sections 34 and 36 formed on opposite sides of said wedge-shaped section 32, lip 38 forming an opening 39 formed in the top 40 of section 32, openings 42 and 44 formed in ends 46 and 48 of elongated sections 34 and 36 respectively. Now referring to FIG. 7, cut 50 is preferably formed along the length of cover 30 for facilitating the efficient installation of cover 30 over assembly 10. The contours of cover 30 as best seen in FIGS. 5, 6, 7 and 8 are necessary to cover and enclose assembly 10. Specifically, wedge-shaped section 32 is contoured to enclose the clevis-type hanger 6 and elongated sections 34 and 36 are contoured to enclose pipe 2, insulation 4 and saddle 12 including corners 16. Elongated sections 34 and 36 are preferably substantially cylindrical to conform to the shape of standard pipe and/or pipe insulation and preferably comprise tapered sections 52 and 54 which provide space between the interior of cover 30 and pipe 2, insulation 4 and saddle 12. Now referring to FIG. 8, the dimensions of the cover 30 are such that a material 60, preferably a sponge-type material or the like, can be inserted under the cover 30, preferably saturated with biocide prior to sealing the cover 30 in place over assembly 10.

In another embodiment as shown in FIG. 6, an additional shallow cut 52 is formed along the bottom 41 of cover 30 to form a hinge means to facilitate the full opening of cover 30. Alternatively, the cover 30 may be formed in two halves.

Opening 39 formed in the top 40 of wedge-shaped section 32 further comprises lip 38 for accommodating and at least partially covering rod 20.

Figure 5A:
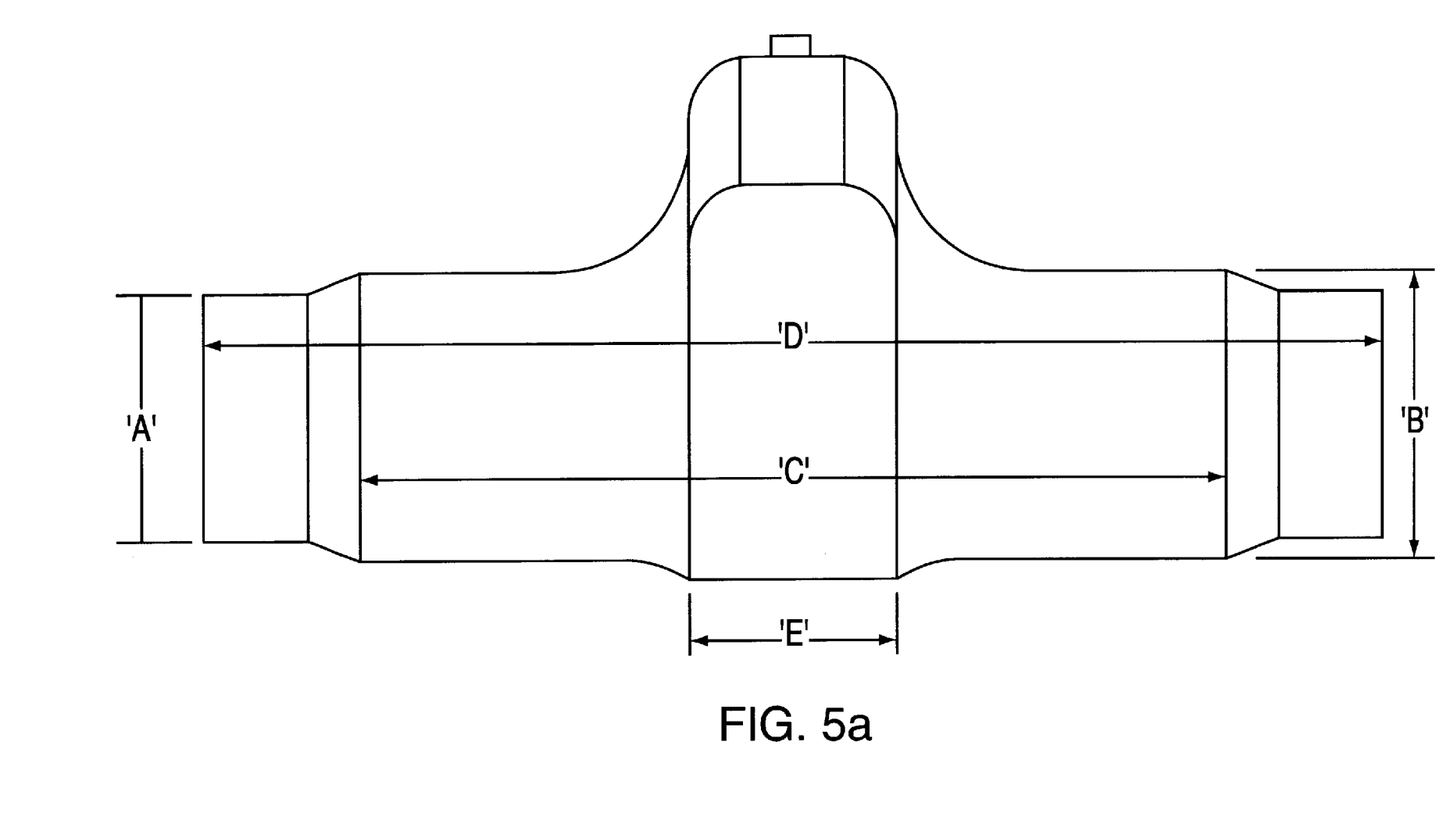
FIG. 5a is a view of the embodiment of FIG. 5 further depicting the dimensions of said embodiment.

Pipes are manufactured in many gauges and pipe insulation in many thicknesses, depending on the desired efficiency. Accordingly, the preferred embodiment of the present invention may be sized to accommodate both bare pipe and insulated pipe. Now referring to FIGS. 5a and 6a, the dimensions of the preferred embodiment of the invention are as follows: as shown in FIG. 5a, dimension A represents the diameter of openings 42 and 44 which measures from about 2" to about 8.5"; dimension B represents the diameter of elongated sections 34 and 36 which measures from about 2.5" to about 9"; dimension C represents the length between the tapered sections 52 and 54 which measures from about 13" to about 17.5"; dimension D represents the length between opposite ends 46 and 48 which measures from about 15.5" to about 21.5 inches; and dimension E represents the length of wedge-shaped section 32 which measures from about 2.25" to about 3". Now referring to FIG. 6a, dimension F represents the widest width of wedge-shaped section 32 which measures from about 5.125" to about 15"; dimension G represents the height of wedge-shaped section 32 which measures from about 5" to about 15"; and dimension H represents the width of lip 38 which measures from about 0.375" to about 0.750". The preferred embodiment of the invention as described hereinabove is best suited to the measurements of the Examples 1–9 set forth in Table 1 below (all measurements are in inches):

TABLE 1

Figure 6A:
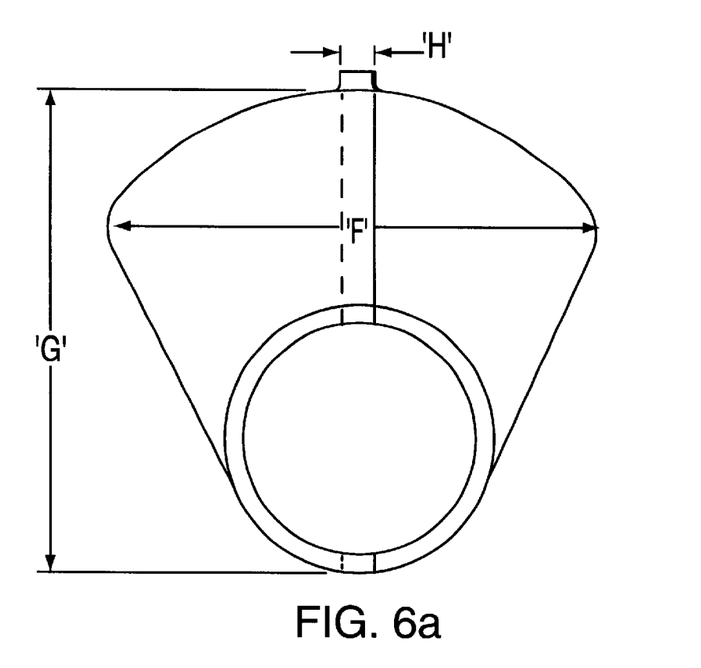
FIG. 6a is a view of the embodiment of FIG. 5 further depicting the dimensions of said embodiment.

| Ex. | A | B | C | D | E | F | G | H |
|---|---|---|---|---|---|---|---|---|
| 1 | 2 | 2.5 | 13 | 15.5 | 2.25 | 5.125 | 5 | 0.375 |
| 2 | 2.5 | 3 | 13 | 16.5 | 3 | 5 | 5 | 0.5 |
| 3 | 3 | 3.25 | 13 | 14.5 | 3 | 6 | 6 | 0.5 |
| 4 | 3.5 | 4 | 13 | 16.5 | 3 | 7.25 | 7.25 | 0.5 |
| 5 | 4 | 4.25 | 13 | 15.5 | 3 | 7.5 | 7.5 | 0.5 |
| 6 | 4.5 | 5 | 3.5 | 17.5 | 3 | 8 | 8 | 0.675 |
| 7 | 5.5 | 6 | 12.5 | 16.5 | 3 | 9.25 | 9.25 | 0.675 |
| 8 | 6.5 | 6.875 | 12 | 15.25 | 3 | 11 | 11 | 0.675 |
| 9 | 8.5 | 9 | 17.5 | 21.5 | 3 | 15 | 15 | 0.750 |

Now referring to FIG. 6, cut 50 substantially bisects cover 30 through lip 38, wedge-shaped section 32 and elongated sections 34 and 36 to facilitate installation of cover 30 over assembly 10. After installation of cover 30, cut 50 is sealed with any suitable adhesive such as but not limited to PVC cement. As best seen in FIG. 5, in a most preferred embodiment at least one sealable opening 66 is formed in the cover 30 to facilitate the introduction of biocide under the cover 30 after the cover 30 is installed. Opening 66 can be sealed with PVC cement, PVC tape, a PVC patch or any reasonably suitable substitute. This and other modifications of this embodiment results in an atmosphere under the cover 30 that deters and minimizes bacteria growth. Prior to installation of the cover 30, a biocide such as but not limited to Lysol or another suitable FDA approved biocide material, is preferably applied onto the assembly 10 by spraying or brushing.

Figure 8:
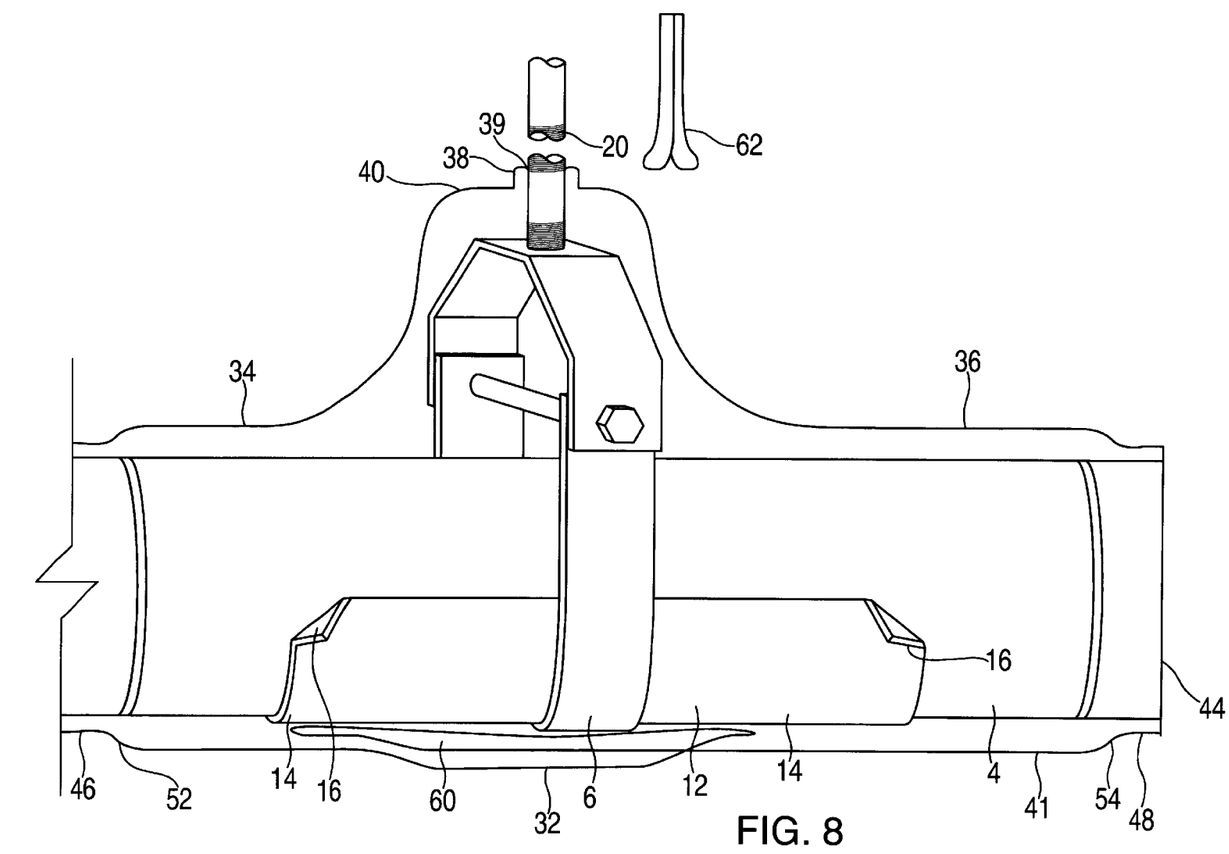
FIG. 8 is an exploded view of the covering of FIG. 5 disposed on the assembly of FIG. 4.

Now referring to FIGS. 6–8, the overhead rod 20 of the assembly 10 from which the clevis-type hanger 6 depends in the preferred embodiment is covered with split tube 6 2, preferably formed of PVC.

Practice has shown that the tube 62 may be sealed in place with any suitable adhesive. A suitable PVC caulk can be used at the junction 64 of the cover 30 and tube 62. The ends 46 and 48 of the cover 30 are then adhered with a suitable adhesive to an adjacent fitting. It is important that a suitable caulk be applied to seal all seams including cut 50 to fuse the cover 30 into a unitary composite unit. Alternatively 2" wide or other suitable width PVC Lape can be used to seal the ends 46 and 48 to adjacent fittings.

The smooth, chemical resistant PVC or modified PVC cover 30 lends itself to easy cleaning such as by wipe on method. The use of a PVC/Acrylic type cover designed for 205 degree deflection temperature such as for example Proto Exotuff® or CPVC material such as for example Proto Exod® with a deflection temperature of 225 degrees can also be used. The PVC/Acrylic material (Exotuff®) can be used for biocide hot water wash downs or the CPVC material can be used for steam wash downs as long as the steam nozzle is maintained one to two feet from the plastic to prevent warping.

Figure 9:
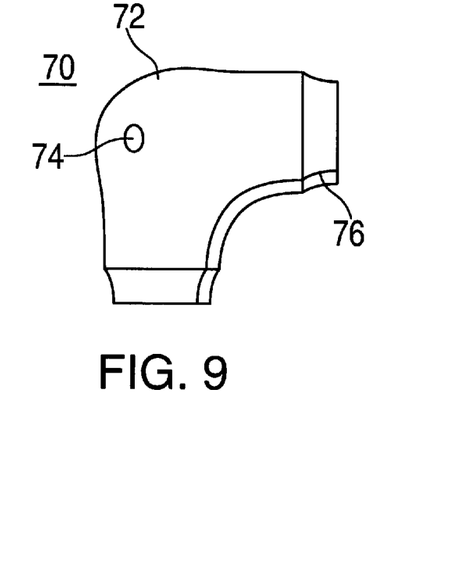
FIG. 9 is a side view another embodiment of the present invention.

Now referring to FIG. 9, in another embodiment the invention comprises substantially a humped formed fitting cover 70 that is made with a deliberate hump 72 molded in to cover existing insulated fitting 82. This embodiment eliminates the need to shave or remove the fitting for reinsulation, preventing possible asbestos cement contamination in the area. This is a considerable improvement over the current available alternative which is to remove the asbestos under strict regulations at very high costs. In this embodiment the cover 70 can accommodate the application of a biocide between the insulated fitting 82 and the cover 70. Cover 70 further comprises cut 76 to facilitate installation over fitting 82. The biocide may be applied to the exterior of the insulated fitting 82 or to the interior of the cover 70 prior to installation of the cover 70. Now referring to FIG. 11, in another embodiment a material such as a sponge 80 for carrying a biocide may be inserted between the fitting 82 and the formed cover 70. The cover may further include a resealable opening 74 for applying additional biocide after the cover 70 is installed over the fitting 82. The hump feature 72 as shown in FIGS. 9 and 11 may be applied and adapted to fitting covers for 45 degree elbows, tees, straight and all other fittings and assemblies.

Figure 10:
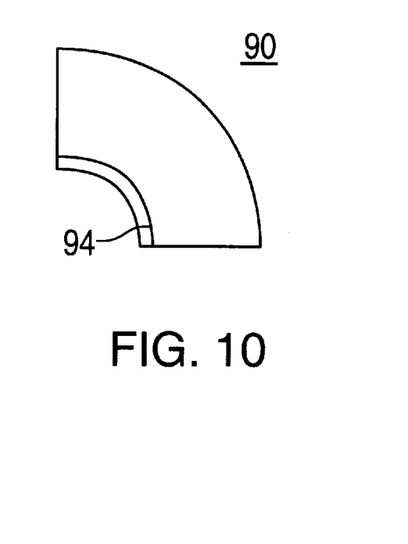
FIG. 10 is a side view of another embodiment of the present invention.

Fitting covers of all shapes may be employed with the present invention. Now referring to FIGS. 10 and 11, fitting covers 90 and 110 without the hump feature may be employed in new installations over shaped type insulations such as 92. Fitting cover 90 further comprises cut 94. Fitting cover 110 further comprises a cut (not shown).

Figure 11:
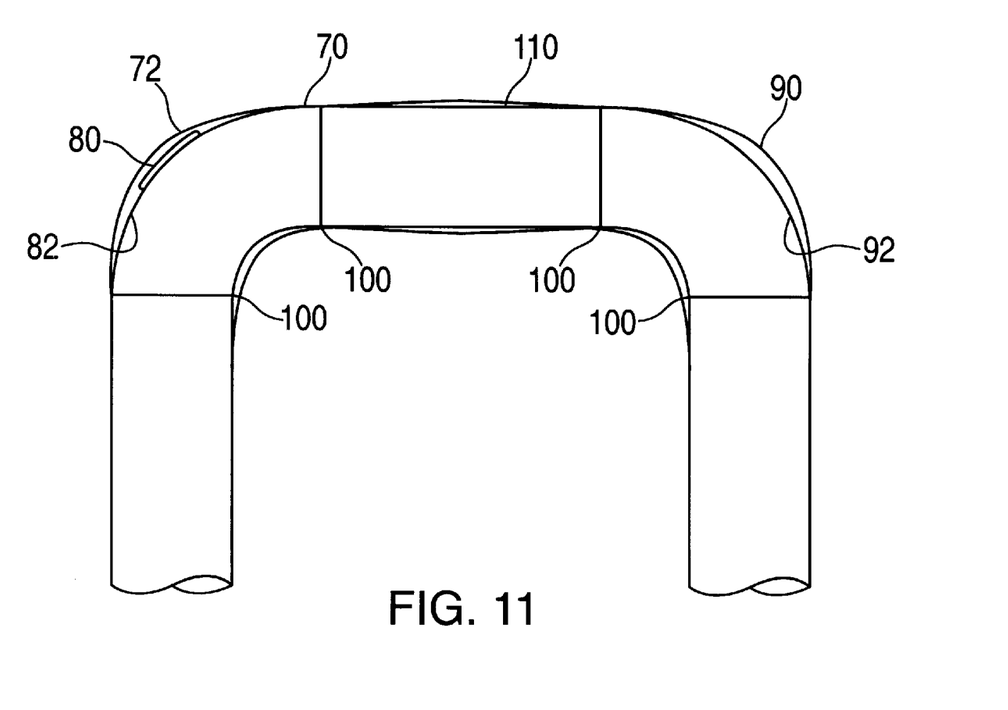
FIG. 11 is a side view of a preferred embodiment of the system of the present invention including an exploded view of the invention according to FIGS. 9 and 10.

Now referring to FIG. 11, the foregoing embodiments of the present invention provide for a system wherein a thin material such as but not limited to ⅛" thick soft polyurethane or sponge 80 can be saturated with biocide, inserted between a cover 72 of the present invention and fitting 82 or other assembly to be covered and the cover sealed over, creating a biocide atmosphere to prevent bacteria growth under the cover. Now referring to FIG. 9, at least one opening 74 can be formed in the cover 72 to allow a periodic application of biocide material to maintain an antibacterial atmosphere under the sealed cover 72. The opening 74 is resealed with PVC cement or a round dot of PVC tape or a suitable substitute. Where the cover is formed of CPVC the opening is preferably sealed with CPVC cement. Now referring to FIG. 11, in the present invention it is critical that all joints 100 between covers 70, 90 and 110 be sealed tight with a suitable adhesive or the like.

In embodiments in which there is insufficient space for a sponge, the biocide material can be painted on or wiped on, before applying and sealing the cover. This system may be employed on all unions, valve covers, Victaulic type covers, specialty fittings, flanges and the like. The present invention also applies to all bare fittings, pipes, pumps and other coverable mechanical Installations and assemblies.

While certain preferred and alternative embodiments of the invention have been set forth for purposes of disclosing the invention, modifications to the disclosed embodiments may occur to those who are skilled in the art. Accordingly, the appended claims are intended to cover all embodiments of the invention and modifications thereof which do not depart from the spirit and scope of the invention.

What is claimed is:

1. A thermoformed cover for an assembly to prevent biological contamination, said assembly comprising a clevis-type hanger and at least a section of pipe supported by said hanger, said cover comprising an interior and an exterior surface and further comprising a central wedge-shaped section for covering said clevis-type hanger, further comprising a top surface having an opening formed thereon and at least one elongated section for covering said pipe, wherein said cover entirely encloses said assembly, and said cover is sealed with a suitable adhesive.

2. The invention according to claim 1 wherein said cover forms a space between said interior surface and said assembly, said space sized to accommodate a material for carrying a biocide.

3. The invention according to claim 1 further comprising at least one sealable opening formed in said cover for introducing biocide under said cover.

4. The invention according to claim 1 wherein said cover is formed of a material selected from the group consisting of PVC, modified PVC, CPVC, metal and coated metal.

5. The invention according to claim 1 wherein said opening formed in said top side of said cover accommodates a support rod of said assembly and further comprising a split tube for covering said rod.

6. The invention according to claim 5 wherein said split tube comprises PVC.

7. The invention according to claim 3 wherein said sealable opening is sealed by a sealing means selected from the group consisting of an adhesive, PVC tape, PVC patch, modified PVC patch, CPVC patch and CPVC/metal patch.

8. The invention according to claim 1 wherein said cover is sealed with a sealing means selected from the group consisting of PVC caulk, PVC tape and modified PVC tape.

9. The invention according to claim 1 wherein biocide is applied between the interior of said cover and said assembly.

10. The invention according to claim 4 wherein said cover is formed of Exod®.

11. The invention according to claim 4 wherein said cover is formed of Exotuff®.

12. The invention according to claim 4 wherein said covers are formed of a mixture of metal and a plastic FDA-acceptable biocide material fused to said metal.

* * * * *